(12) United States Patent
Sanger

(10) Patent No.: US 7,400,335 B2
(45) Date of Patent: Jul. 15, 2008

(54) METHOD FOR PRINTING A HALFTONE DIGITAL IMAGE

(75) Inventor: Kurt M. Sanger, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 586 days.

(21) Appl. No.: 10/714,315

(22) Filed: Nov. 14, 2003

(65) Prior Publication Data

US 2004/0095592 A1    May 20, 2004

Related U.S. Application Data

(63) Continuation of application No. 10/196,013, filed on Jul. 16, 2002, now Pat. No. 6,717,601.

(51) Int. Cl.
B41J 2/385 (2006.01)
(52) U.S. Cl. .................. 347/115; 347/232; 347/131
(58) Field of Classification Search ............... 347/43, 347/101, 105, 106; 358/1.9, 298, 459
See application file for complete search history.

(56) References Cited

U.S. PATENT DOCUMENTS

| | | | |
|---|---|---|---|
| 4,630,125 A | 12/1986 | Roetling | 358/280 |
| 5,164,742 A | 11/1992 | Baek et al. | 346/76 L |
| 5,208,871 A | 5/1993 | Eschbach | 382/41 |
| 5,250,934 A | 10/1993 | Denber et al. | 345/136 |
| 5,255,085 A | 10/1993 | Spence | 358/527 |
| 5,258,854 A | 11/1993 | Eschbach | 358/445 |
| 5,293,539 A | 3/1994 | Spence | 358/527 |
| 5,309,246 A * | 5/1994 | Barry et al. | 358/1.9 |
| 5,483,351 A | 1/1996 | Mailloux et al. | 358/298 |
| 5,680,485 A | 10/1997 | Loce et al. | 382/257 |
| 6,072,588 A * | 6/2000 | Dohnomae | 358/1.9 |
| 6,115,140 A | 9/2000 | Bresler et al. | 358/1.9 |
| 6,204,874 B1 | 3/2001 | Michelson | 347/176 |
| 6,378,983 B1 * | 4/2002 | Ito et al. | 347/43 |
| 2003/0076515 A1 * | 4/2003 | Schuppan | 358/1.9 |

OTHER PUBLICATIONS

ANSI/CGATS; Graphic technology—Graphic arts reflection densitometry measurements—Terminology, equations, image elements and procedures; Apr. 1993, p. 7.

* cited by examiner

Primary Examiner—Lam S Nguyen
(74) Attorney, Agent, or Firm—Nelson A. Blish

(57) ABSTRACT

A method for printing a halftone digital image on both a printing press and a color proofer using the same binary digital data which comprises making a printing plate from the binary digital data; making a press sheet using a press with the printing plate; sending the binary digital data to a dot-gain processor for conditioning the binary digital data to introduce a predetermined level of dot-gain; transmitting the conditioned binary digital data to the color proofer; and printing a halftone color proof on the color proofer.

13 Claims, 7 Drawing Sheets

METHOD FOR PRINTING A HALFTONE DIGITAL IMAGE

CROSS REFERENCE TO RELATED APPLICATIONS

This is a continuation of application Ser. No. 10/196,013, filed Jul. 16, 2002, issued as U.S. Pat. No. 6,717,601.

FIELD OF THE INVENTION

This invention generally relates to apparatus for printing halftone images and more particularly relates to an apparatus and method for modifying halftone dot size for an image processed by an imaging apparatus.

BACKGROUND OF THE INVENTION

In a digital printing workflow there is a need to be able to proof bitmap files used to make printing plates. Presently, customer artwork consisting of contone images, linework, and text, is first sent to a digital halftone proofer or inkjet printer. The artwork is corrected until the proof is approved for the press. In the case were the artwork is proofed on a digital halftone proofer such as described by Baek et al. in U.S. Pat. No. 5,164,742, the raster image processor (RIP) adjusts the input continuous tone data using a calibration dot-gain curve such that the tone-scale of the proof matches the tone-scale of the press-sheet. After the proof is approved, the job is sent to a second RIP which applies a second dot-gain curve for generating the plate used in the press-run.

The first and second RIPs may be the same but are typically separate and may be located apart from each other. The first and second RIPs are preferably the same type and version such that the halftone dots created and algorithms used by each device are an exact match. Many times the two RIPs are not an exact match, which can create problems. Sometimes incorrect dot-gain correction files are used. Sometimes the artwork is changed in-between creating the proof and the plates and the press-run no longer matches the approved proof.

Another disadvantage in the current system is that an error in the creation of the bitmaps for printing is not known until the plates are loaded onto the press and the press-run is started. For a press capable of over 1,000 impressions per hour considerable amount of production is lost if the plates are found to be corrupt and need to be remade.

An important aspect in creating a halftone proof is predicting dot-gain or tone-scale. Dot-gain is a known phenomenon attributable to ink spread, ink absorption by the print media, and optical effects between the ink and the paper. The dot-gain varies with the size and shape of the halftone dots, the printing device, the inks, and the paper used, etc. For a digital proof, halftone dots in a color separation are composed of micro-pixels that give the halftone dot its shape and size. Dot-gain for a digital proof corresponds to increasing dot size by adding micro-pixels. Dot-loss for a digital proof corresponds to decreasing dot size by eliminating micro-pixels. Dot-gain correction consists of adding and subtracting gain to match the response at different percent dot inputs.

In the printer described in U.S. Pat. No. 5,164,742 many steps are required to match the press. First the exposure for each color plane is adjusted to match the solid area density. Second the dot-gain for each color plane is adjusted to achieve a dot-gain match at different halftone tint levels. Third the dot-gain curves and density levels may be fine tuned to achieve either a good neutral match in the three color overprints or a color match for flesh tones. For some work, other memory colors such as green grass or light blue sky may be matched as the critical color. Finally the dot-gain curves may be further adjusted to deliver better performance in the highlight, or shadow areas. These steps are critical and typically take much iteration between the proof operator and the customer to achieve the look that the customer desires. It is important to be able to adjust the proofer to achieve this look as there are other controls on the press that may be adjusted to effect the dot-gain and tonal control of the press-run. By adjusting the performance of the proofer, the customer is selecting the quality of the proofs that will be used by the pressmen to match.

Once the proofer has been setup to match the press, the customer uses subsequent proofs to setup the press. This is an important point. The proofer setup is used to simulate the press such that the pressman may then use the proofs to setup the press to achieve the customer's intent. Every job going through the proofer will be adjusted with a setup. There may be different setups for each press or press type. There may also be different setups for different customers using the same proofer. Finally there may also be standard setups that are used to simulate jobs across many different presses.

The same job is typically "ripped" again when going to press. This time the RIP is programmed to generate 50% area coverage on plate for the 50% color input. The press is then run to deliver a fixed amount of gain at the 50% input level. Dot-gain is due to the smearing of the ink from the plate to a blanket, the smearing of ink from the blanket to the job paper, and the optical gain of the ink on top of the paper. The control is usually split between the plate making device delivering 50% area coverage for a 50% input, and the press delivering 50% plus its intrinsic dot-gain. Typical dot-gain levels for a Web-fed offset press are 15% to 25% at the 50% input level. Because the dot-gain occurs on the press instead of at the plate writer the bitmaps used to create the plate will not contain enough gain to make the proof. Proofs made from these bitmaps will be washed out and the contrast will be significantly reduced. Colors will also shift, as the gain in each color will be proportional to the dot area coverage.

Other digital halftone printing devices such as that disclosed by Michalson in U.S. Pat. No. 6,204,874 use a binary proofing media that does not allow for adjusting the density level of the solid colorants. A different process is used to adjust these devices for a close press match, including adjusting the tone-scale or dot-gain curve used to make the bitmap file. However the ideal dot-gain curve on these systems is still different from the dot-gain curves used to make the plates. Even if the same machine is imaging the plate and the proof as disclosed in U.S. Pat. No. 6,204,874.

Inkjet printing devices are also sometimes used to make a proof. These devices typically image from 300 dpi to 1440 dpi writing resolutions using multiple cyan, magenta, yellow, and sometimes black inks. In addition software such as "Best Screen Proof" available from Best Gmbh, or Black Magic available from Serendipity Software Pty Ltd., may be used to simulate the printing of a halftone screen. This software attempts to measure the halftone screen and adjust the printed output to achieve a close color match to a given target. Resolution of the inkjet devices does not allow for a good match of the halftone dot structure. The color match developed does simulate the tone-scale or dot-gain correction, but only through the driving of the overlapping colors on the proof. The quality of the halftone in the printed proof is significantly compromised. Dots in the highlight and shadow areas are destroyed in trying to match the overall density level in these systems. This is because the inkjet output drops are too large.

Therefore one inkjet drop is used to replace many halftone dots in the highlight or bright areas, while one inkjet hole is used to replace many halftone holes in the shadows.

A halftone screen at 150 lines per inch, 6 lines per mm, covers an area of approximately 28,674 µm². An inkjet printer with a 3 pL drop size will produce a dot with a diameter of about 25 µm covering an area of 625 µm². This may vary depending upon the spread into the paper. A single inkjet drop represents a 2.18% change in area within a 150 line screen halftone. To achieve finer resolution the Best Screen Proof, and Black Magic, software use additional inks to image multi-level colorants. Typically a light cyan and light magenta ink are added to the cyan, magenta, yellow, and black primaries to achieve finer control of the tone-scale. While this creates a proof with a close visual color match, the structure of the halftone dots within the image is seriously degraded.

The conventional proofing solution, using a digital color halftone proofer, is to RIP the file for proofing separate from ripping the file for printing, adding dot-gain to the proofing file as part of the ripping process. U.S. Pat. No. 5,255,085 describes a method to adjust the tone reproduction curve of a press or output printer. U.S. Pat. No. 5,255,085 creates a target from the press or desired output proof, benchmarks the characteristics of the proofing device, and discloses a method to generate a lookup table to adjust the dot-gain of the original file to achieve the aim on the proofing device. U.S. Pat. No. 5,293,539 adds adaptive process values to interpolate between measured Benchmark and Aim data sets to calibrate the dot-gain tone-scale curve at other screen rulings, screen angles, and dot shapes. Utilizing these techniques to modify the dot-gain curves and hence the tone-scale curves of the proofing device increases the chances for error. The input file and its subsequent components must be available for both RIPs. The same versions of each file and components must be specified. The same fonts must be available for both RIPs. The correct dot-gain curve must be specified at both RIPs. The chances for error to occur increase with each ripping operation, especially when the RIPs are located at separate sites.

Ripping the file twice is also time consuming. Each RIP operation must read the input files, decide where each of the components is to be placed in the output print, convert continuous tone images using the correct dot-gain curve into high resolution halftones, render text and linework, and output a high resolution bitmap which represents the composite image. This is repeated for each color in the output print.

The digital color halftone proofer implements dot-gain by modifying the code values being printed through a curve prior to converting the code values into the halftone bitmap with the raster image processor. The dot-gain is only applied to the continuous tone image data and not the line work or text. The dot-gain may be adjusted for each of the primary colors cyan, magenta, yellow, and black. A dot-gain curve may also be specified for spot colors orange, green, red, blue, white, and metallic. A dot-gain curve may also be specified for a Equation 1 Murray-Daives Dot Area Calculation $$PercentArea = \frac{10^{-D_{tint}} - 10^{-D_{paper}}}{10^{-D_{solid}} - 10^{-D_{paper}}}$$

recipe color which is imaged using a single bitmap in combination of two or more standard colors at unique exposure levels. A dot-gain curve may also be specified for each colorant within a recipe color. In this last case more than one bitmap is used, however the halftone dots are at the same screen ruling, screen angle, and phase, such that each halftone dot in each color substantially overlap.

A typical example is a target curve. Such a target might specify that the 50% cyan halftone should print at 67%, the 25% cyan halftone should print at 35%, and the 75% cyan halftone should print at 80%. A benchmark proof is then run and measured. Dot area is calculated based on measured density using the equation defined by Murray-Davies. Equation 1 is the Murray-Davies equation is defined in ANSI/CGATS. 4-1993, 1993, p. 7. A dot-gain adjustment curve is then created to add the correct amount to cyan to achieve the target values at the target inputs. For instance in this example it may be found that an output value of 35% was achieved at an input level of 30% in the benchmark proof. Therefore 5% dot-gain at the 25% input level is added to achieve the 35% target. At the 50% level it may be found that the target level of 67% at an input level of 57% is achieved requiring the addition of 7% at the 50% input. At the 75% level it may be found the 80% target at the 76% input requiring 1% dot-gain is achieved. In actual practice the dot-gain in 5% or 10% steps may be measured with some additional measurements between 0 to 10% and 90 to 100%. A spline curve is usually fit to the resulting dot-gain curve to provide a table in 1% input increments or less. Smoothing is sometimes performed on the input target and benchmark data to further reduce artifacts in the adjustment process.

Perup Oskofot has shown a software program, which operates on high resolution scans from their scanners. The program takes a binary high-resolution scan of a halftone film and descreens it to a lower resolution continuous tone image. Typically the scan resolution is 2400 dpi. The resulting continuous tone image may be 8-bits per pixel at 300 dpi resolution. A dot-gain curve is then applied to the descreened image. The adjusted image is then ripped to a bitmap image at 2400 dpi. This software system was disclosed at Drupa 2000, a tradeshow. One problem with this method is that it requires a reripping step. To accomplish this requires a RIP. Plus it must be known what the original halftone screen shape, screen ruling, and screen angle were in order to faithfully reproduce it with the re-ripping step. Another problem is that all RIPs are not the same. There are subtle differences between them such as the method that they use to add noise to hide the quantization affects in screening the image. This means that one RIP may not sufficiently reproduce all the screens that the customer might digitize. Another problem with this method is that it is extremely slow. A small 8×10 inch image at 2400 dpi scanned resolution took more than an hour to process a single color plane.

Additionally, some customers have halftone films, which they would like to use in their digital workflow. These customers scan the film at a high resolution, for example 100 pixels/mm, and quantize each pixel to a binary value. Because the dot-gain is built into the film, there is no method other than descreening the bitmap file, adding dot-gain, and reripping the file, to calibrate the output print. If the original film was made using an optical technique then the dot shape, screen ruling, and screen angle may not be an exact match to a digital RIP. Descreening and rescreening the high resolution scan may not faithfully reproduce the original screens.

U.S. Pat. No. 5,250,934 discloses a method of shifting and adding a bitmap image with itself to thin the image displayed. U.S. Pat. No. 5,250,934 discloses a method of setting a bit to an intermediate level if it is diagonally between two active bits using shifting, logical and, and a logical or operation.

U.S. Pat. No. 5,483,351 discloses using a 4×4 input to a lookup table to determine how to operate on the central 2×2 pixels to implement halfbit or fullbit dilation and erosion in U.S. Pat. No. 5,483,351. U.S. Pat. No. 5,483,351 has the advantage of knowing some of the surrounding pixels in deciding how to dilate or erode the pixels in the center. U.S. Pat. No. 5,258,854 teaches how to resize bitmap images in small amounts less than one full bit in size.

U.S. Pat. No. 5,680,485 discloses logically combining two morphological filter pairs and an original image to create an output image. The morphological filters described are erosion filters, one of which has less erosion than desired and the other having more erosion than desired. Logically combining combinations of the original image with the two eroded images provides for a method of obtaining an intermediate result.

U.S. Pat. No. 5,208,871 describes a method of resizing an input bitmap, which simulates a scan of an output image from an input bitmap such that the scan resolution is different from the input bitmap. Error diffusion is utilized to quantize the output bitmap into the desired output bit resolution. This example uses error diffusion to spread out the error in the quantization of a multilevel pixel into a reduced number of output states.

U.S. Pat. No. 6,115,140 uses a descreened version of an original image, and dilated and eroded versions of the original image to select a combination of the original, dilated, and eroded images to effect a dot-gain or tone-scale change in an input bitmap image. U.S. Pat. No. 6,115,140, FIG. 5B shows an original halftone image input into block H1 along with an eroded version (HE), and two dilated versions (HD1 and HD2). Then a weight based on descreened versions of the original halftone (CO), the color corrected original (CI), the eroded original (CE), and the two dilated originals (CD1 and CD2) is calculated. The descreened images are used to select which of the four halftone images, HI, HE, HD1, and HD2, are transferred into H1 and H2. The weighting function is then used to merge bitmap versions of H1 and H2 together into the tone-scaled output bitmap (HO). How to descreen is not disclosed, nor exactly how to calculate which bit of H1 and H2 is used to drive the output bit HO. The need to use error diffusion to distribute the error in selecting between H1 or H2 is not mentioned.

In U.S. Pat. No. 6,115,140 dilation is described as growing a single pixel completely around the halftone feature. A second dilation grows two pixels completely around the halftone feature. Similarly erosion subtracts a single pixel completely around the halftone feature.

None of references in U.S. Pat. No. 6,115,140 teach how to perform descreening. U.S. Pat. No. 4,630,125 performs descreening by comparing the number of white and dark pixels within a specified area. U.S. Pat. No. 4,630,125 also states that "A partial solution known in the art is to spatially filter the halftone image with a low pass filter." U.S. Pat. No. 4,630,125 teaches that the spatial filter method is not exact as it tends to blur the original image.

Thus, there exists a need for optimizing the process of adding dot-gain while maintaining dot fidelity. A system that adds dot-gain to bitmaps used to make printing plates, and that proofs these bitmaps so that the press-sheets made with same printing plates are known prior to running the plates on press, does not exist.

SUMMARY OF THE INVENTION

It is an object of the present invention to provide a method of implementing dot-gain correction to digital halftone bitmap files directly without descreening then reripping the data.

It is an object of the present invention to provide a method of implementing dot-gain correction to digital halftone bitmap files while preserving dot fidelity; wherein halftone dots in the original bitmaps will not be created; wherein halftone dots will not be created in the output proof, where there were none there to begin with; and wherein holes will not be created in solid areas where there were no holes to begin with.

Briefly, according to one aspect of the present invention a system for printing a halftone digital image on both a printing press and a color proofer using the same binary digital data comprises sending the binary digital data to the printing press. The binary digital data is sent to a dot-gain processor for conditioning the binary digital data to introduce a predetermined level of dot-gain. The binary digital data is transmitted to the color proofer and a halftone color proof is printed on the color proofer.

A feature of the present invention is that it uses the same rasterized file for prepress and final press operations. This provides a high measure of confidence for a customer who purchases a printed product based on a digital proof.

It is an advantage of the present invention to allow a straightforward method that compensates for dot-gain in order to predict the final appearance of the digital halftone image. Because it operates on a file that is rasterized once, the method of the present invention allows dot-gain for an image to be adjusted without requiring an additional time consuming rasterization process.

It is an advantage of the present invention to provide a method that can be used to adapt a rasterized file to one or more prepress apparatus.

It is an advantage of the present invention to provide a proofing and printing system, which has the capability to adjust the binary bitmap files to make the proof and the print appear to be visually the same.

It is an advantage of the present invention that the press-sheet may be estimated and approved prior to taking the press down to mount and align the plates.

These and other objects, features, and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

While the specification concludes with claims particularly pointing out and distinctly claiming the subject matter of the present invention, it is believed that the invention will be better understood from the following description when taken in conjunction with the accompanying drawings, wherein:

DETAILED DESCRIPTION OF THE INVENTION

The present description is directed in particular to elements forming part of, or cooperating more directly with, apparatus in accordance with the invention. It is to be understood that elements not specifically shown or described may take various forms well known to those skilled in the art.

Figure 1:
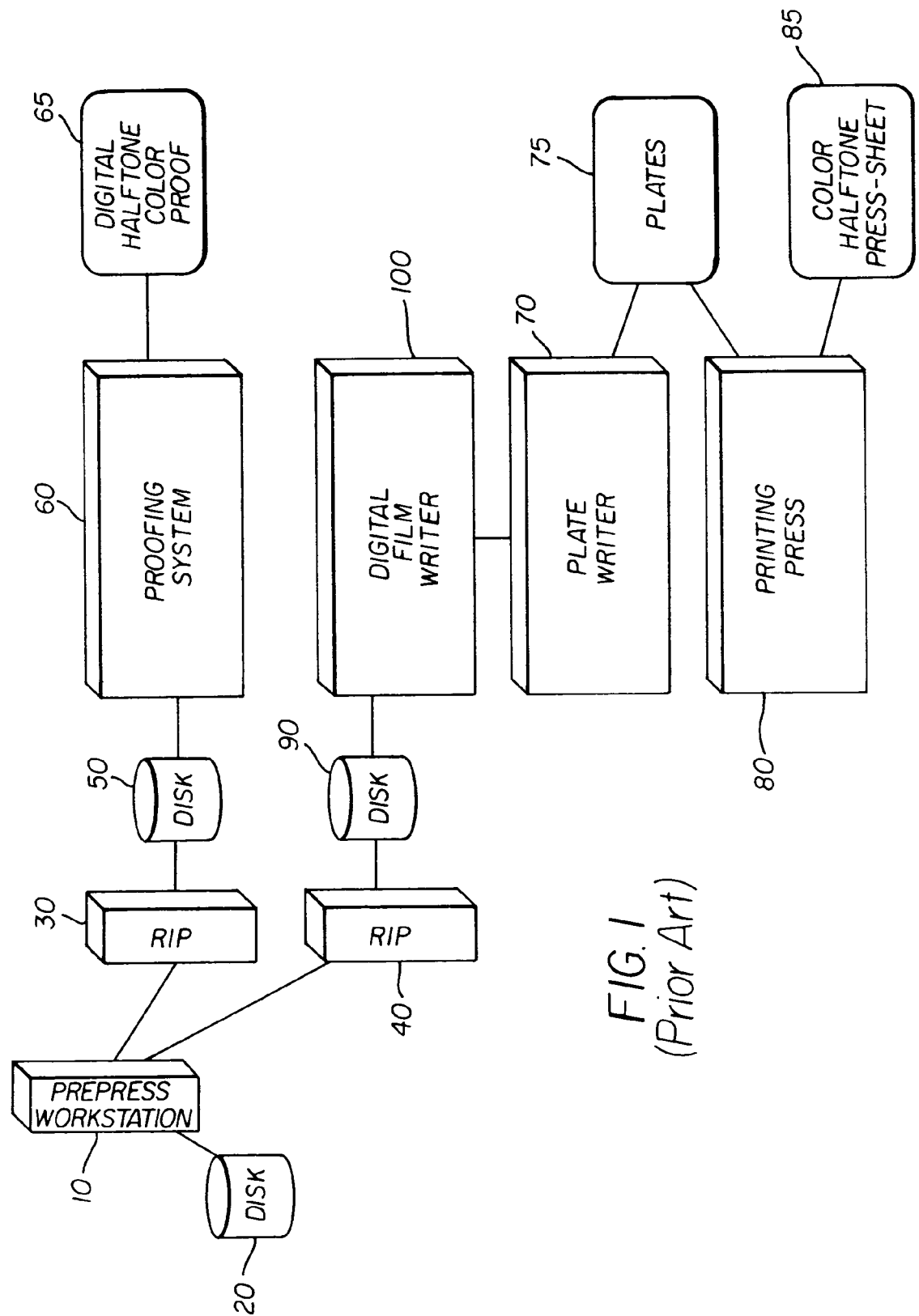
FIG. 1 is a block diagram showing the conventional workflow for digital halftone file processing.

Referring to FIG. 1, there is shown a prepress workstation 10, with customer artwork stored on disk 20. The customer may store images, text and line-work on disk 20. The customer may use a program such as Quark's QuarkXPress to combine the images, text, and line-work into a job consisting of one or more pages. The QuarkXPress Program running on the prepress workstation 10 may output the job as a postscript or portable document format (PDF), file to either the RIP for proofing 30, or the RIP for printing 40. Each RIP may consist of a software RIP running on a PC such as Harlequin "ScriptWorks" by Global Graphics Software LTD.

RIP 30 has a postscript text file, which specifies the dot-gain adjustment for proofing to be applied to all of the continuous tone images within the customer job. This file contains the input and output percent dot relationships for all the colors in the job. The procedure to create this lookup table is described by Spence and implemented in Kodak software, "Dot-gain Manager", which is available in Kodak Approval Digital Halftone Proofers. The RIP will convert cyan, magenta, yellow, and black (CMYK) continuous tone images through the dot-gain lookup table. Then the RIP will convert the continuous tone image into a halftone image at the writing resolution of the proofing system 60. The halftone bitmap images may be sent directly from RIP 30 to printer 60 or they may be temporarily stored on disk 50. The proofing system outputs a digital halftone color proof 65.

RIP 40 will have a similar postscript text file that specifies the dot-gain adjustment for press to be applied to all of the continuous tone images within the customer job. The dot-gain curve on RIP 40 may be used to linearize the plate such that a 50% input creates 50% dot area coverage on plate. The 50% dot area coverage on the plate then produces a press sheet on press with additional gain. The plate writer 70 may have an intrinsic gain associated with it, which is compensated for in the same dot-gain curve in RIP 40. The plate writing system 70 may be positive or negative writing, such that areas exposed on plate may accept or reject ink on press. The positive or negative sense of the plate writer will typically require negative or positive dot-gain adjustment to create a linear plate. Typically plate writers have a loss or gain of 1% to 3%.

The plate writing system 70 may be co-located in the printing press 80. In this case the press contains additional capability of being able to image the printing plates which are already mounted on the press.

A digital film writer 100 may precede the plate writing system. The bitmaps used to make the film or plate may be stored temporarily on disk 90 prior to making the film or plate. If a digital film writer is used then the films may be used to make the plate by making an optical contact exposure. This is a well known process in the art. The additional dot-gain or dot loss due to the contact exposure and processing of the plate may be compensated for in the dot-gain curves used to make the film.

It is understood that there may also be iterative steps of making film and plates with the end result of a plate being mounted in the press used to create a press sheet with the customer artwork. The dot-gain curve used in RIP 40 may contain compensation for all of the steps used to create the plate. In addition the dot-gain curve in RIP 40 may also contain compensation for a given press to achieve a desired target.

The plate writing system 70 outputs a set of digital plates 75 used in the printing press 80 to create color halftone press-sheets 85. Note that the invention may also be used in black and white, single, or multiple color systems and is not limited to process color, CMYK, printing systems.

Figure 2:
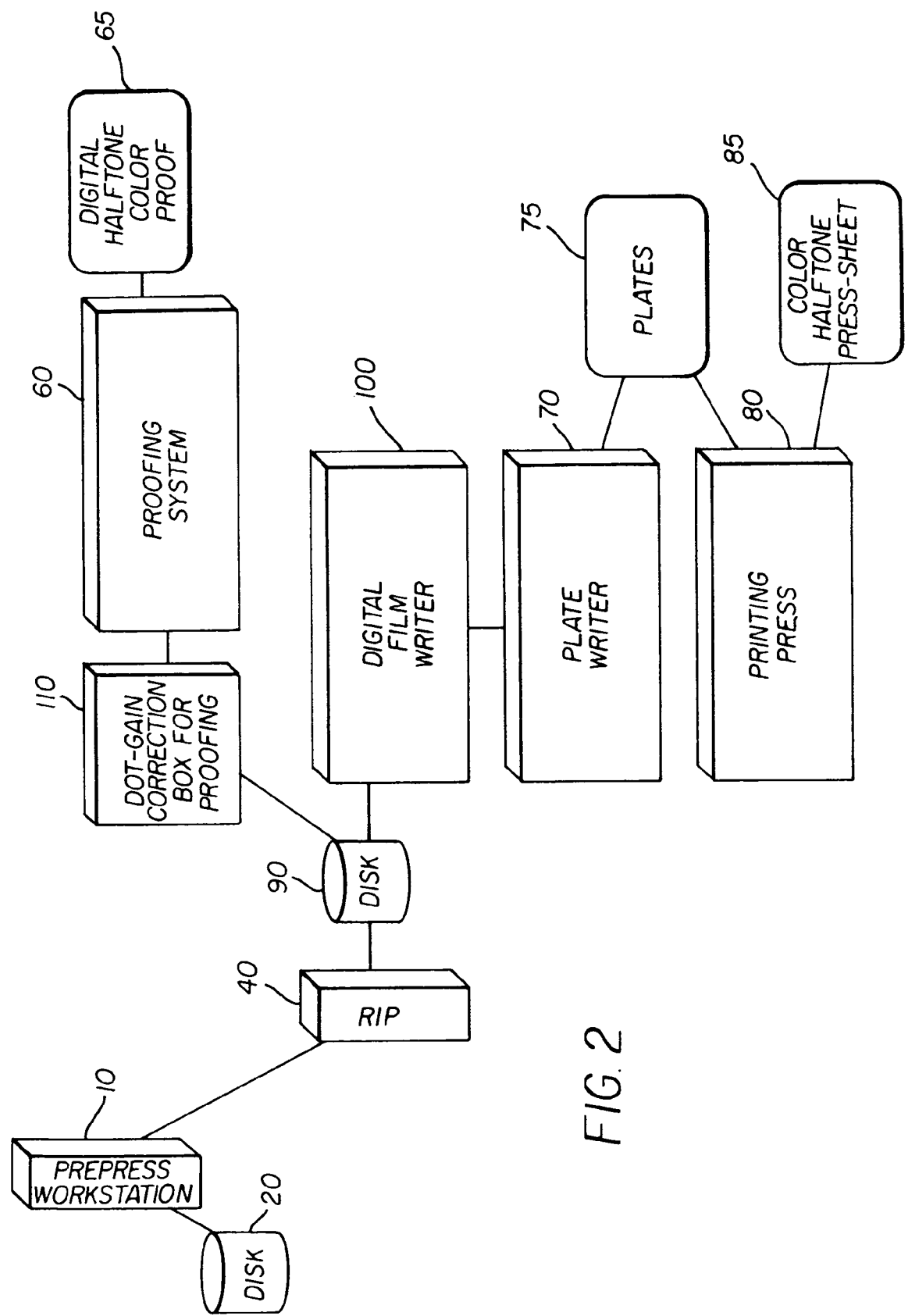
FIG. 2 is a block diagram showing the method of the present invention for adding dot-gain to a digital halftone file.

Referring now to FIG. 2 one preferred embodiment of the present invention is shown. The customer artwork is stored on disk 20. The customer may store images, text and, line-work on disk 20. The customer may use a program such as Quark's QuarkXPress to combine the images, text, and line-work into a job consisting of one or more pages. The QuarkXPress Program running on the prepress workstation 10 may output the job as a postscript or portable document format (PDF), file to the RIP 40 for printing and or proofing. The RIP may consist of a software RIP running on a PC such as Harlequin "ScriptWorks" by Global Graphics Software LTD.

RIP 40 will have a postscript text file which will specify the dot-gain adjustment for press to apply to all of the continuous tone images within the customer job. The dot-gain curve on RIP 40 may be used to linearize the plate such that a 50% input creates 50% dot area coverage on plate. The 50% dot area coverage on the plate then produces a press sheet on press with additional gain. The plate writer 70 may have an intrinsic gain associated with it, which is compensated for in the dot-gain curve in RIP 40. The plate writing system 70 may be positive or negative writing, such that areas exposed on plate may accept or reject ink on press. The positive or negative sense of the plate writer will typically require negative or positive dot-gain adjustment to create a linear plate. Typically plate writers have a loss or gain of 1% to 3%.

The plate writing system 70 may be co-located in the printing press 80. In this case the press contains additional capability of being able to image the printing plates which are already mounted on the press.

A digital film writer 100 may precede the plate writing system. The bitmaps used to make the film or plate may be stored temporarily on disk 90 prior to making the film or plate. If a digital film writer is used then the films may be used to make the plate by making an optical contact exposure. This is a well known process in the art. The additional dot-gain or dot loss due to the contact exposure and processing of the plate may be compensated for in the dot-gain curves used to make the film.

It is understood that there may also be iterative steps of making film and plates with the end result of a plate being mounted in the press used to create a press sheet with the customer artwork. The dot-gain curve used in RIP 40 may contain compensation for all of the steps used to create the plate. In addition the dot-gain curve in RIP 40 may also contain compensation for a given press to achieve a desired target.

The plate writing system 70 outputs a set of digital plates 75 used in the printing press 80 to create color halftone press-sheets 85.

The bitmap images stored or copied to disk may also be sent using dot-gain correction box 110 to the proofing system 60. In this case the dot-gain correction box 110 would be programmed to unbuild the dot-gain curves used to make the plates and add the dot-gain correction required to allow the proofing system 60 to match the target. The unbuild and dot-gain correction is performed in one step using a single combined curve.

To obtain the dot-gain curve used in the dot-gain on bitmap calculation the customer runs a test proof through the RIP 40 to make plates 75 and a press sheet 85 on press 80. The press sheet 85 made with the test proof is measured and becomes the target press sheet values. The bitmaps made for the test proof are stored in disk 90. These same bitmaps are passed directly to the proofing system 60 bypassing the dot-gain on bitmap calculation 110. The resulting proof is called the benchmark proof 65. The benchmark proof is measured and compared to the target press sheet values. The dot-gain adjustment required to add to the percent dot into the dot-gain on bitmaps calculator 110 are calculated by finding or calculating the input value resulting in an output value on the benchmark proof required to achieve the output value on the target press sheet.

In order to show how this dot-gain adjustment is used one implementation of the dot-gain on bitmaps calculation will be discussed. One skilled in the art will recognize that this is just one implementation of performing the dot-gain directly on bitmap files and that other implementations such as U.S. Pat. No. 6,115,140 may be substituted to accomplish the same effect.

Figures 3, 5:
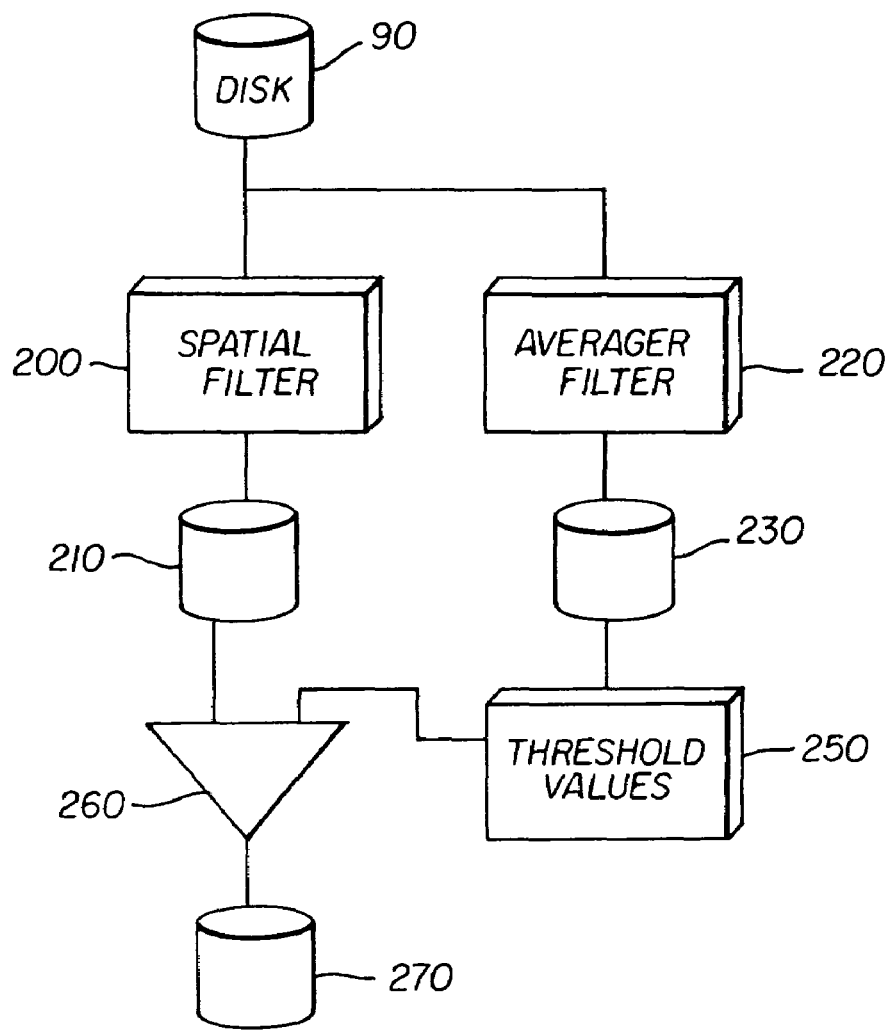
FIG. 3 is a flow diagram showing the processing steps for adding dot-gain compensation to a rasterized halftone digital image file.
FIG. 5 contains a spatial filter used in one example.

The dot-gain on bitmap calculation is performed as shown in FIG. 3. The halftone bitmap image on plate writing system disk 90 is convolved through a spatial filter 200 to create a blurred continuous tone image 210. The halftone bitmap image 90 is simultaneously passed through an averager filter 220 to create a local area averaged image 230. For each pixel in the image the averaged image 230 is used to estimate the dot area in. The output of the averager 230 is input to a lookup table 240, which contains a table of threshold levels 250. For each pixel the level of the blurred image 210 is compared to the threshold value 250 in comparator 260. The output of the comparator 260 is the dot-gain adjusted halftone bitmap 270. This bitmap 270 is then sent to the proofer 60. For this example FIG. 5 is used for the spatial filter 200. The averager size is 13 pixels by 13 lines.

Figure 4:
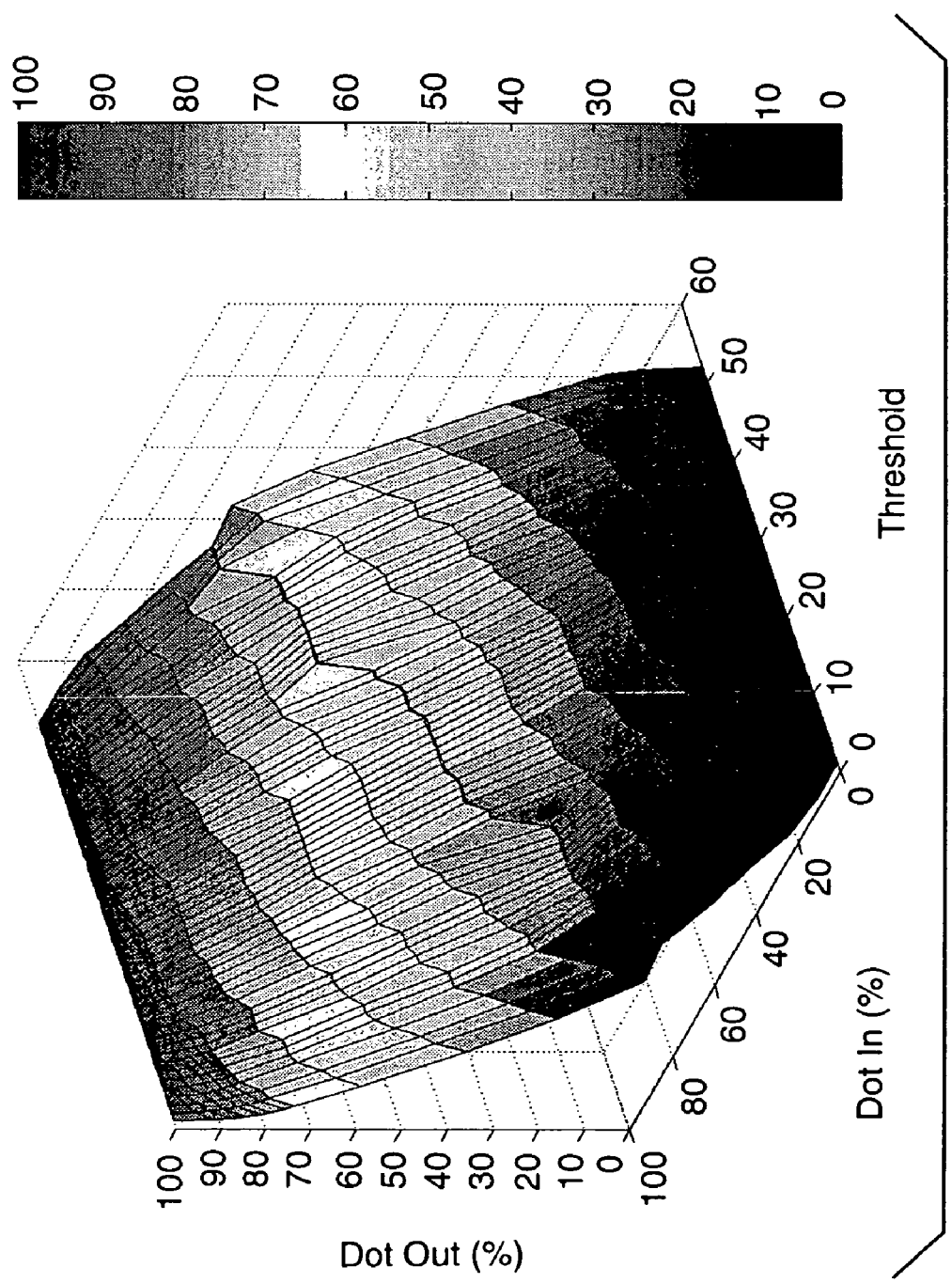
FIG. 4 contains a graph of percent dot out verses percent dot in by threshold value for the dot-gain method described.

To compute the table of threshold levels 250 required to achieve the desired dot-gain curve a test proof is used instead of the customer artwork located in disk 20. The test proof consists of solid tints from 0% to 100%. For each tint, the RIP 40 creates the bitmap on disk 90. The same bitmap is run through the dot-gain compensation circuit 110 using fixed threshold values from 0 to 53. These values depend on the spatial filter chosen. For this example the spatial filter shown in FIG. 5 is used. The output of the average 210 is also recorded for each tint. For this example a 13 pixel by 13 line averager is used. This is the measure of percent dot in, expressed as averager output. The output bitmap 270 is printed and the resulting density on the print is measured. The density to percent dot using the Murray-Davies equation is converted. Dot-gain is calculated by subtracting the percent dot input from the measured percent dot output. The percent dot-gain verses percent dot input verses threshold level is plotted shown in FIG. 4. One more relationship is needed between percent dot input verses averager output to determine the lookup table address for the given percent dot in. This may be obtained by recording the averager output during the processing of each solid tint, or counting the average number of pixels on within an area of the same size as the averager for each tint in bitmap 90. To estimate the threshold for intermediate points a spline curve fit may be performed.

To compute the table of threshold levels 250 required to achieve the desired dot-gain curve for a scanned halftone bitmap input the process is repeated using a scanned tint scale instead of the customer artwork Note that each screen ruling, screen angle, and dot shape will have a different response and must be modeled separately. The described embodiment requires numerous calculation steps prior to performing the dot-gain compensation on the customer's bitmaps, however these steps may be performed ahead of time so that the actual dot-gain correction may be replicated quickly on each incoming bitmap file.

A single bit in a 2540 dot per inch, 100 micro-pixels per mm., bitmap file represents an area of 100 um$^2$. In a 150 line screen halftone, 6 lines per mm., this represents a 0.34% dot change allowing us to faithfully reproduce a given dot-gain target by adding or subtracting micro-pixels within the bitmap file.

Figure 6C:
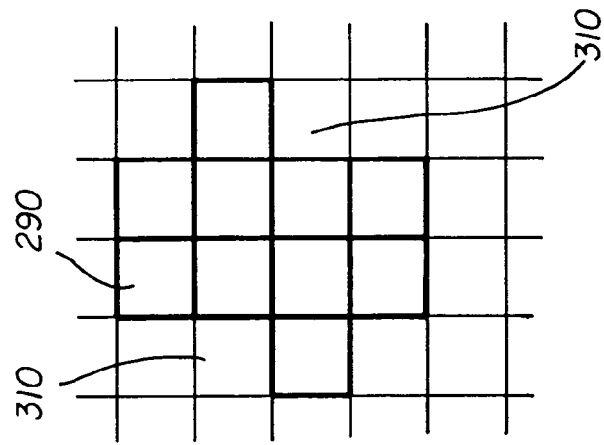
FIGS. 6a-c show an input bitmap (6a), an output bitmap with gain (6b), and an output bitmap with dot loss (6c)
Figure 6B:
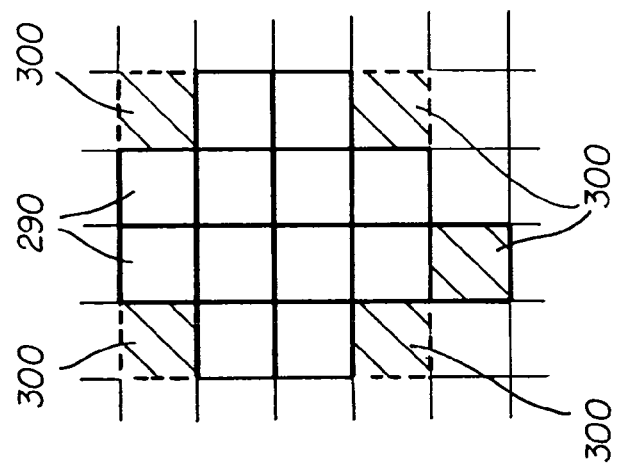
Figure 6A:
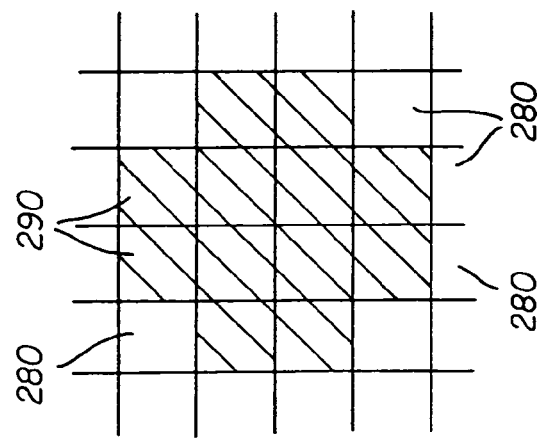

FIGS. 6a, 6b, and 6c, are an example showing how the bitmaps might be modified using this invention. FIG. 6a shows an input dot with 12 micro-pixels on, 290. Off micro-pixels are shown as 280. The 13×13 averager output would be 12 out of a possible 169 for a percent dot input of approximately 7.1%. FIG. 6b shows an addition of 5 micro-pixels 300, for an output halftone dot consisting of a total of 17 micro-pixels or approximately 10.1%. FIG. 6c shows a subtraction of 2 micro-pixels 310, for a dot loss of 1.1%. The spatial filter blurs the incoming bitmap, while the threshold and compare operation defines a new outline of the existing halftone dot. This preserves the halftone dot in the output bitmap while adjusting the apparent tonescale of the output image. To compensate for different halftone screen rulings and angles the size of the averager needs to change. Also the averager may be larger than one halftone cell such that the calculated dot percentage may be based on a fractional output of the averager.

Figure 7:
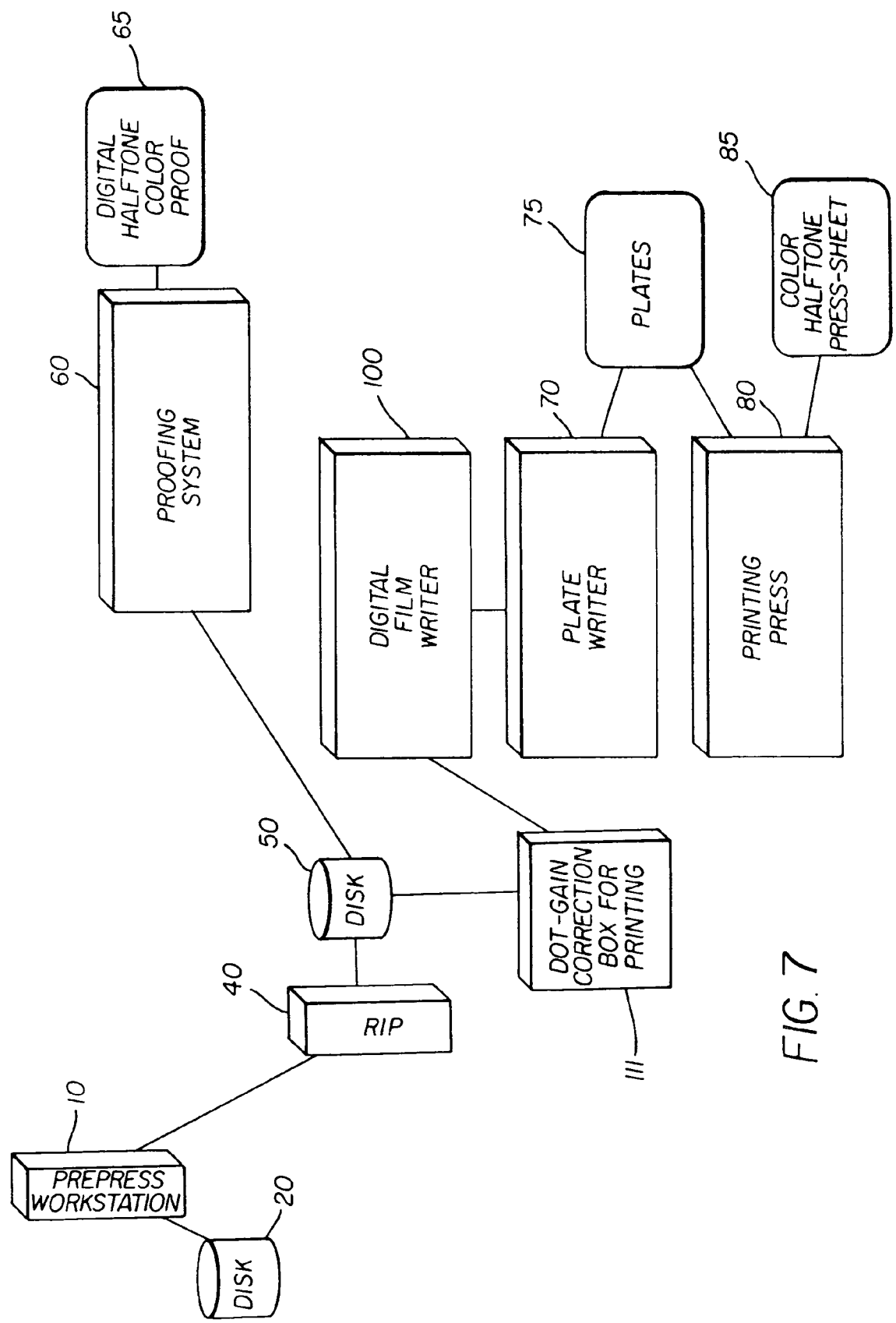
FIG. 7 is a block diagram showing the method of the present invention for adding dot-gain to the digital halftone files used to make the printing plates.

Referring now to FIG. 7 another embodiment of the present invention is shown. The customer artwork is stored on disk 20. The customer may store images, text and, line-work on disk 20. The customer may use a program such as Quark's QuarkXPress to combine the images, text, and line-work into a job consisting of one or more pages. The QuarkXPress Program running on the prepress workstation 10 may output the job as a postscript or portable document format (PDF), file to the RIP 30 for proofing and printing. The RIP may consist of a software RIP running on a PC such as Harlequin "Script-Works" by Global Graphics Software LTD. RIP 30 will have a postscript text file which will specify the dot-gain adjustment for proofing to apply to all of the continuous tone images within the customer job. The dot-gain curve on RIP 30 may be used to match a known standard such as the Committee for Graphic Arts Technical Standardization (CGATS) Technical Report 001 (TR001).

RIP 30 will output cyan, magenta, yellow, and black bitmaps to disk 50 on their way to proofer 60 to create proof 65. The bitmaps for proofing may also be used with the present invention 111 to create printing plates 75. Here the present invention, 111, dot-gain correction box for printing will be programmed to unbuild the dot-gain correction for proofing and build in the dot-gain correction required such that the press-sheet 85 matches the proof 65.

The plate writing system 70 may be co-located in the printing press 80. In this case the press contains additional capability of being able to image the printing plates which are already mounted on the press.

A digital film writer 100 may precede the plate writing system. The dot-gain correction device 111 would then be programmed to take into account the additional gain or loss required due to the digital film writer, 100, and the contact process of making the plates 75.

It is understood that there may also be iterative steps of making film and plates with the end result of a plate being mounted in the press used to create a press sheet with the customer artwork. The dot-gain curve used in the dot-gain correction device 111 may contain compensation for all of the steps used to create the plate. In addition the dot-gain curve may also contain compensation for a given press to achieve a desired target.

To obtain the dot-gain curve used in the dot-gain on bitmap calculation the customer runs a test proof through the RIP 30 to make plates 75 and a press sheet 85 on press 80. The press sheet 85 made with the test proof is measured and becomes the benchmark press sheet values. The bitmaps made for the test proof are stored in disk 50. These same bitmaps are passed directly to the proofing system 60. The resulting proof is called the target proof 65. The benchmark proof is measured and compared to the target proof values. The dot-gain adjustment required to add or subtract to the percent dot into the dot-gain on bitmaps calculator 111 are calculated by finding or calculating the input value resulting in an output value on the benchmark proof required to achieve the output value on the target proof.

Figure 8:
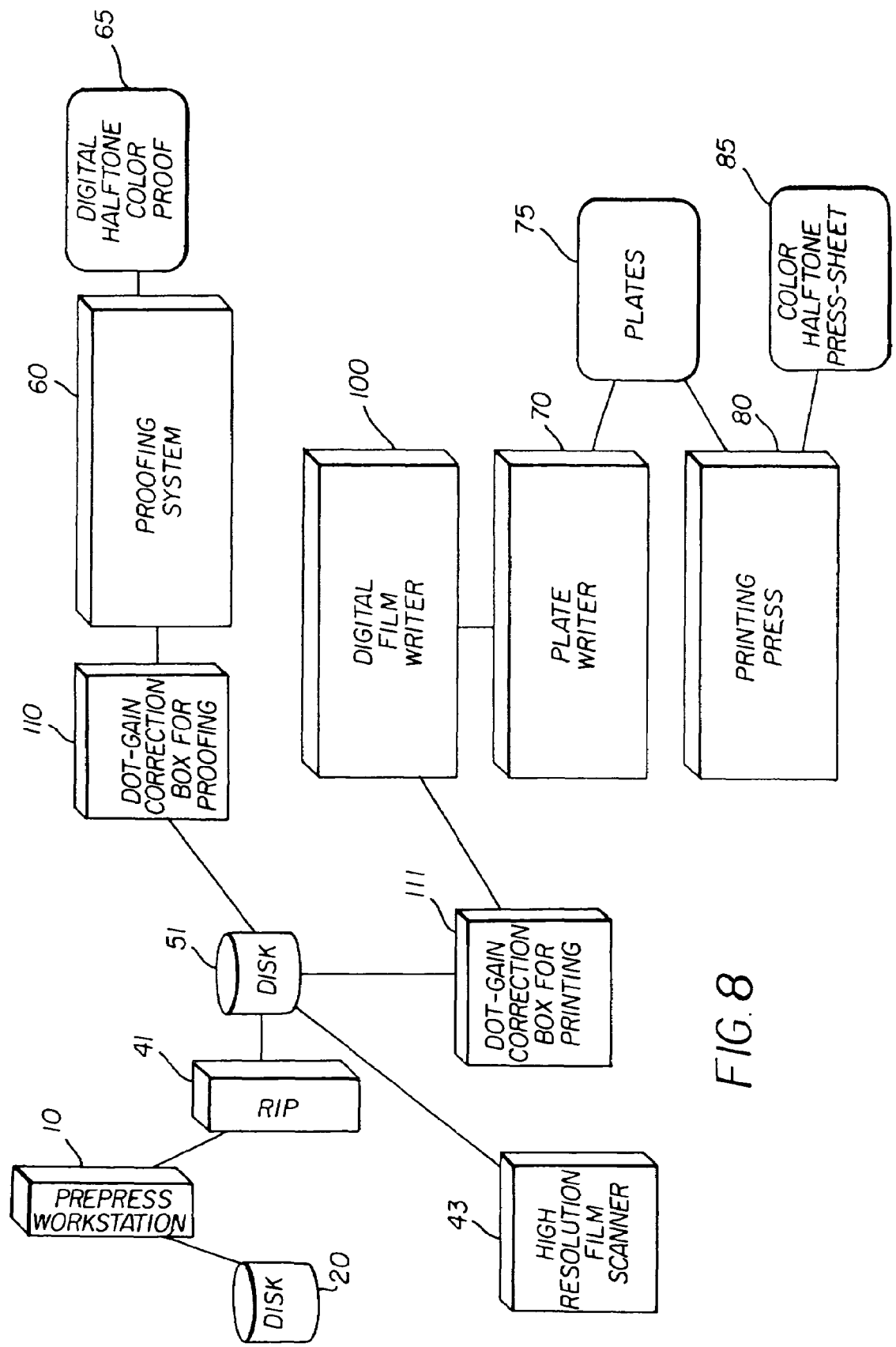
FIG. 8 is a block diagram showing the method of the present invention for adding dot-gain to the digital halftone files for use in making the proof, and adding dot-gain to the same digital halftone files for use in making the plates.

Referring now to FIG. 8 another embodiment of the present invention is shown. The customer artwork is stored on disk 20. The customer may store images, text and, line-work on disk 20. The customer may use a program such as Quark's QuarkXPress to combine the images, text, and line-work into a job consisting of one or more pages. The QuarkXPress Program running on the prepress workstation 10 may output the job as a postscript or portable document format (PDF), file to the RIP 41 for proofing and printing. The RIP may consist of a software RIP running on a PC such as Harlequin "ScriptWorks" by Global Graphics Software LTD. RIP 41 will have a postscript text file which will specify the dot-gain adjustment to apply to all of the continuous tone images within the customer job. The dot-gain curve on RIP 41 may be used to match a known standard such as the Committee for Graphic Arts Technical Standardization (CGATS) Technical Report 001 (TR001).

RIP 41 will output cyan, magenta, yellow, and black bitmaps to disk 51 on their way to proofer 60 and plate writer 70.

A high resolution scanner 43 may also be used to generate digital bitmap files from scans of analog films to be stored on disk 51 on their way to the proofer 60 and plate writer 70.

A dot-gain on bitmaps calculator 110 may be used to modify the bitmaps stored on disk 51 for creating proof 65 with proofer 60. Another dot-gain on bitmaps calculate 111 may be used to modify the bitmaps stored on disk 51 for creating press-sheet 85 on press 80 using plates 75 from plate writer 70 or digital film writer 100.

The invention has been described in detail with particular reference to certain preferred embodiments thereof, but it will be understood that variations and modifications can be effected within the scope of the invention as described above, and as noted in the appended claims, by a person of ordinary skill in the art without departing from the scope of the invention.

PARTS LIST

10. Prepress workstation
20. Disk with customer artwork
30. Raster image processor (RIP) for proofing
40. Raster image processor (RIP) for printing
43. High resolution film scanner
50. Proofing system disk
51. Proofing and printing system disk
60. Proofing system
65. Digital halftone color proof
70. Plate writer
75. Plates
80. Printing press
85. Color halftone press-sheet
90. Plate writing system disk
100. Digital film writer
110. Dot-gain correction box for proofing
111. Dot-gain correction box for printing
200. Spatial filter
210. Blurred continuous tone image
220. Averager filter
230. Local area averaged image
240. Lookup table
250. Threshold values
260. Comparator
270. Dot-gain adjusted halftone bitmap
280. Off micro-pixel
290. On micro-pixel
300. Additional micro-pixel to add dot-gain
310. Deleted micro-pixel to subtract dot-gain

What is claimed is:

1. A method for printing a halftone digital image on both a printing press and a color proofer using the same binary digital data comprising:

generating binary digital data that defines a halftone image, the binary digital data representing presence or absence of micropixels in the forming of halftone dots;

making a printing plate from said binary digital data;

making a press sheet using said printing press with said; printing plate:

operating upon said binary digital data by a dot-gain processor for conditioning said binary digital data to provide a predetermined level of dot-gain, the dot-gain providing binary digital data corresponding to increasing sizes of halftone dots by adding respective micropixels thereto;

providing said conditioned binary digital data to said color proofer;

printing a halftone color proof on said color proofer; and wherein a raster image processor provides dot-gain in generating of said conditioned binary digital data, the dot-gain provided by said raster image processor being conditioned for use by the color proofer; and operating on said conditioned binary digital data to unbuild the dot-gain provided by said raster image processor and build in dot-gain correction to form binary digital data that is conditioned for use in forming of a printed sheet by said printing press.

2. A method for printing a halftone digital image as in claim 1 wherein any dot-gain provided maintains halftone dot fidelity.

3. A method for printing a halftone digital image on both a printing press and a color proofer using the same binary digital data comprising:

generating binary digital data that defines a halftone image, the binary digital data representing presence or absence of micropixels in the forming of halftone dots;

making a printing plate from said binary digital data;

making a press sheet using said printing press with said printing plate;

operating upon said binary digital data by a dot-gain processor for conditioning said binary digital data to provide a predetermined level of dot-gain, the dot-gain providing binary digital data corresponding to increasing sizes of halftone dots by adding respective micropixels thereto;

providing said conditioned binary digital data to said color proofer;

printing a halftone color proof on said color proofer; and wherein a raster image processor provides dot-gain in generating of said conditioned binary digital data, the dot-gain provided by said raster image processor being conditioned for use in forming of a printed sheet by said printing press; and operating on said conditioned binary digital data to unbuild the dot-gain provided by said raster image processor and build in dot-gain correction to form the binary digital data that is conditioned for use in forming of a color proof by said color proofer.

4. A method for printing a halftone digital image as in claim 3 wherein any dot-gain provided maintains halftone dot fidelity.

5. A method for printing a halftone digital image on both a printing press and a color proofer using the same binary digital data comprising:

generating binary digital data that defines a halftone image, the binary digital data representing presence or absence of micropixels in the forming of halftone dots;

making a printing plate from said binary digital data;

making a press sheet using said printing press with said printing plate;

operating upon said binary digital data by a dot-gain processor for conditioning said binary digital data to provide a predetermined level of dot-gain, the dot-gain providing binary digital data corresponding to increasing sizes of halftone dots by adding respective micropixels thereto;

providing said conditioned binary digital data to said color proofer;

printing a halftone color proof on said color proofer; and wherein a raster image processor provides dot-gain in generating of said conditioned binary digital data; and operating on said conditioned binary digital data to unbuild the dot-gain provided by said raster image processor and build in dot-gain correction to form binary digital data that is conditioned for use in forming of a color proof by said color proofer; and operating on said conditioned binary digital data to unbuild the dot-gain provided by said raster image processor and build in a dot-gain that is conditioned for use in forming of a printed sheet by said printing press.

6. A method for printing a halftone digital image as in claim 5 wherein any dot-gain provided maintains halftone dot fidelity.

7. A method for printing a halftone digital image on both a printing press and a color proofer using the same binary digital data comprising:

generating binary digital data that defines a halftone image, the binary digital data representing presence or absence of micropixels in the forming of halftone dots;

making a printing plate from said binary digital data;

making a press sheet using said printing press with said printing plate;

operating upon said binary digital data by a dot-gain processor for conditioning said binary digital data to provide a predetermined level of dot-gain, the dot-gain providing binary digital data corresponding to increasing sizes of halftone dots by adding respective micropixels thereto;

providing said conditioned binary digital data to said color proofer;

printing a halftone color proof on said color proofer; and wherein a processor provides dot-gain in generating of said conditioned binary digital data, the dot-gain provided by said processor being conditioned for use by the color proofer; and operating on said conditioned binary digital data to unbuild the dot-gain provided by said processor and build in dot-gain correction to form binary digital data that is conditioned for use in forming of a printed sheet by said printing press.

8. A method for printing a halftone digital image as in, claim 7 wherein any dot-gain provided maintains halftone dot fidelity.

9. A method for printing a halftone digital image on both a printing press and a color proofer using the same binary digital data comprising:

generating binary digital data that defines a halftone image, the binary digital data representing presence or absence of micropixels in the forming of halftone dots;

making a printing plate from said binary digital data;

making a press sheet using said printing press with said printing plate;

operating upon said binary digital data by a dot-gain processor for conditioning said binary digital data to provide a predetermined level of dot-gain, the dot-gain providing binary digital data corresponding to increasing sizes of halftone dots by adding respective micropixels thereto;

providing said conditioned binary digital data to said color proofer;

printing a halftone color proof on said color proofer; and wherein a processor provides dot-gain in generating of said conditioned binary digital data, the dot-gain provided by said processor being conditioned for use in forming of a printed sheet by said printing press; and operating on said conditioned binary digital data to unbuild the dot-gain provided by said processor and build in dot-gain correction to form the binary digital data that is conditioned for use in forming of a color proof by said color proofer.

10. The A method for printing a halftone digital image as in claim 9 wherein any dot-gain provided maintains halftone dot fidelity.

11. A method for printing a halftone digital image on both a printing press and a color proofer using the same binary digital data comprising:

generating binary digital data that defines a halftone image, the binary digital data representing presence or absence of micropixels in the forming of halftone dots;

making a printing plate from said binary digital data;

making a press sheet using said printing press with said printing plate;

operating upon said binary digital data by a dot-gain processor for conditioning said binary digital data to provide a predetermined level of dot-gain, the dot-gain providing binary digital data corresponding to increasing sizes of halftone dots by adding respective micropixels thereto;

providing said conditioned binary digital data to said color proofer;

printing a halftone color proof on said color proofer; and wherein a processor provides dot-gain in generating of said conditioned binary digital data; and operating on said conditioned binary digital data to unbuild the dot-gain provided by said processor and build in dot-gain correction to form binary digital data that is conditioned for use in forming of a color proof by said color proofer; and operating on said conditioned binary digital data to unbuild the dot-gain provided by said processor and build in a dot-gain to form binary image data that is conditioned for use in forming of a printed sheet by said printing press.

12. A method for printing a halftone digital image as in claim 11 wherein any dot-gain provided maintains halftone dot fidelity.

13. A method for printing a halftone digital image as in claim 12 and wherein a digital film writer is used in forming of a printed sheet by said printing press and the binary data that is conditioned for use in forming of a printed sheet by said printing press is compensated for in operation of the digital film writer.

* * * * *